(12) United States Patent
Nomura

(10) Patent No.: US 6,181,388 B1
(45) Date of Patent: Jan. 30, 2001

(54) PROJECTOR OF A REFLECTION TYPE

(75) Inventor: Masaaki Nomura, Saitama (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 08/824,785

(22) Filed: Mar. 26, 1997

(30) Foreign Application Priority Data

Mar. 27, 1996 (JP) .................................................. 8-072476

(51) Int. Cl.[7] .................................................. G02F 1/1335
(52) U.S. Cl. .................................................. 349/5; 353/98
(58) Field of Search .................................................. 349/5, 6, 113, 349/175; 353/98, 31, 122

(56) References Cited

U.S. PATENT DOCUMENTS 5,206,673 * 4/1993 Kawahara et al. ..................... 353/98
5,617,226 * 4/1997 Ohmae et al. ......................... 349/10

* cited by examiner

*Primary Examiner*—Frank G. Font
*Assistant Examiner*—Tu T. Nguyen
(74) *Attorney, Agent, or Firm*—Young & Thompson

(57) ABSTRACT

A projector of a reflection type has a Fresnel lens disposed under a stage surface on which a transparency is set. A light source is disposed under the Fresnel lens, and illuminates the stage surface through the Fresnel lens. An illuminating mirror is disposed in a position higher than the stage surface, reflects light passed through the transparency after emanation from the light source, and illuminates the transparency downwards. A projection lens projects an image of the transparency via the Fresnel lens to a screen. A liquid crystal display (LCD) panel is disposed so that the stage surface lies thereon, and displays an image to be projected to the screen. The LCD panel is transparent when the transparency is set on the stage surface, and enables projection of the image.

12 Claims, 3 Drawing Sheets

PROJECTOR OF A REFLECTION TYPE

BACKGROUND OF THE INVENTION

1. Field of the Invention

The present invention relates to a projector of a reflection type. More particularly, the present invention relates to a projector of a reflection type having a body, where an image of a transparency can be projected, has a small height.

2. Description Related to the Prior Art

An overhead projector is an apparatus for presentation to a great number of onlookers or audience with an image of a transparency in an enlarged size on a screen. It is known to use a liquid crystal display (LCD) panel of a transmittance type in combination with the overhead projector. The LCD panel projects a video image, such as a motion picture image, to a screen, and also smooths an operation of setting one image after another. An example of the LCD panel consists of a twisted nematic (TN) type of liquid crystal device, and is placed on a stage of the overhead projector. The LCD panel is connected to a video player, a microcomputer, or the like to receive an input of an image, and displays the image in the form of a motion picture or computer-graphic (CG) image.

There are suggestions of an LCD-fitted overhead projector in which the LCD panel is built in the overhead projector. In the LCD-fitted overhead projector, the LCD panel of the twisted nematic type is contained in the stage of the overhead projector. There is also a proposal of using a nematic-cholesteric phase-transition (NCPT) type of the LCD panel in the LCD-fitted overhead projector. The LCD panel of the nematic-cholesteric phase-transition type is characteristically capable of having a maximized optical transmittance as high as 80–90%. This is advantageous as high contrast and sharpness are obtained in projecting an image of the LCD panel or the transparency.

The overhead projector herein is a reflection type more recent than a transmittance type of overhead projector. The transmittance-type projector contains a light source in its base. The transparency is illuminated by the light source directly in an upward direction. The disposition of the light source in the transmittance-type projector is a short-coming as it enlarges the height of the projector. The reflection type of the overhead projector has the light source contained in the rear of a projector head as a top of the projector. The illuminating light is initially passed down to the transparency, and is reflected upward to the projector head upon illuminating the transparency. The reflection type is more advantageous over the transmittance-type projector, as the height of projector is the smaller because of the disposition of the light source.

In FIG. 4, a reflection type of LCD-fitted overhead projector 2 is illustrated. The overhead projector 2 includes a stage 7 and a stay 8 disposed erectly from the stage 7. The stage 7 includes a Fresnel lens 3, a liquid crystal display (LCD) panel 4, an illuminating mirror 5 and a driver circuit board 6, which are overlaid on one another. The LCD panel 4 is a nematic-cholesteric phase-transition type. The stay 8 supports a light source 9, a condenser lens 10, path converter mirrors 11 and 12 and a projector head 14. The projector head 14 includes a projection lens 13.

In the overhead projector 2, the light from the light source 9 of the projector head 14 is reflected not only by the illuminating mirror 5 but by a surface of the Fresnel lens 3. This additional partial reflection of the surface of the Fresnel lens 3 does not affect a projecting operation of an image of the LCD panel 4, but affect a projecting operation of an image of a transparency 16, as depicted in the enlarged drawing. The reflected light from the surface of the Fresnel lens 3 illuminates the transparency 16. Due to a considerable thickness of the LCD panel 4 between the Fresnel lens 3 and the illuminating mirror 5, the light reflected by the illuminating mirror 5 is remarkably deviated from the light reflected by the surface of the Fresnel lens 3. A double-projection phenomenon occurs, as an image is projected in a double manner on a screen 17.

SUMMARY OF THE INVENTION

In view of the foregoing problems, an object of the present invention is to provide a projector of a reflection type in which an image of a transparency can be projected even by the projector of which a body has a small height.

In order to achieve the above and other objects and advantages of this invention, a projector of a reflection type includes a Fresnel lens disposed on a first side with respect to a stage surface on which a transparency is set. A light source is disposed on the first side with respect to the Fresnel lens, for illuminating the stage surface through the Fresnel lens. An illuminating mirror is disposed on a second side with respect to the stage surface opposite to the first side, for reflecting light passed through the transparency after emanation from the light source to illuminate the transparency from the second side toward the first side. A projection lens projects an image of the transparency via the Fresnel lens to a screen. There is a liquid crystal display panel disposed so that the stage surface lies thereon, the liquid crystal display panel being transparent when the transparency is set on the stage surface, for enabling projection of the image, the liquid crystal display panel displaying an image to be projected to the screen when the stage surface lacks a transparency set thereon.

In a preferred embodiment, the liquid crystal display panel is a nematic-cholesteric phase-transition type.

Furthermore, there is a projector body in which the light source, the Fresnel lens and the projection lens are incorporated. A sheet cover is disposed on the projector body in a rotatable manner, and has the illuminating mirror incorporated therein.

The liquid crystal display panel is secured to the projector body, and has a top face on which the stage surface lies.

In another preferred embodiment, the liquid crystal display panel is secured to the sheet cover and covers the illuminating mirror.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
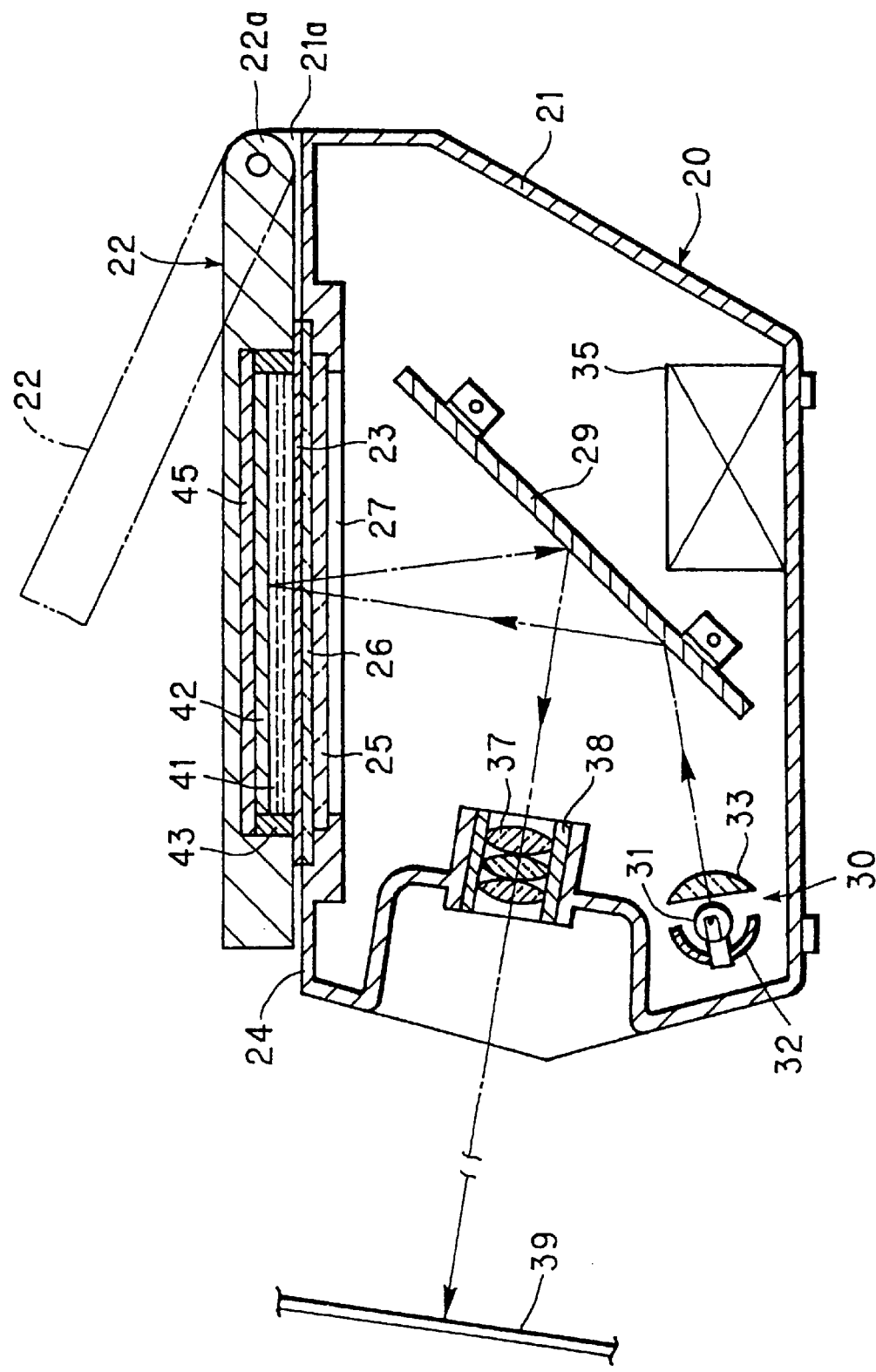
FIG. 1 is a vertical section illustrating an overhead projector.
Figure 2:
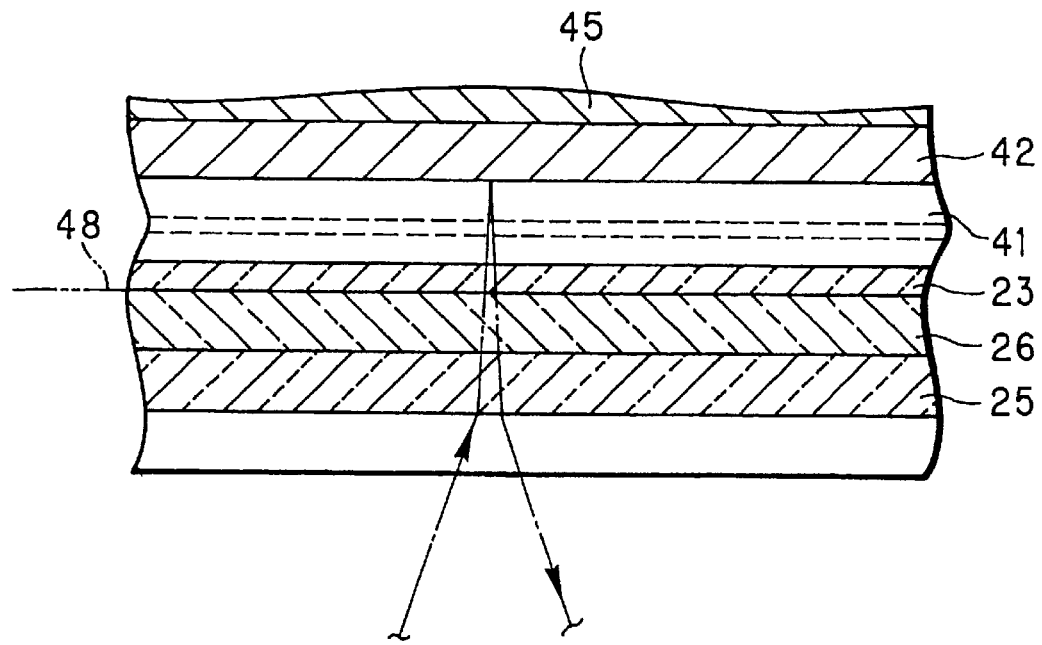
FIG. 2 is an explanatory view in section illustrating a stage and a sheet cover of the overhead projector with a transparency.
Figure 3:
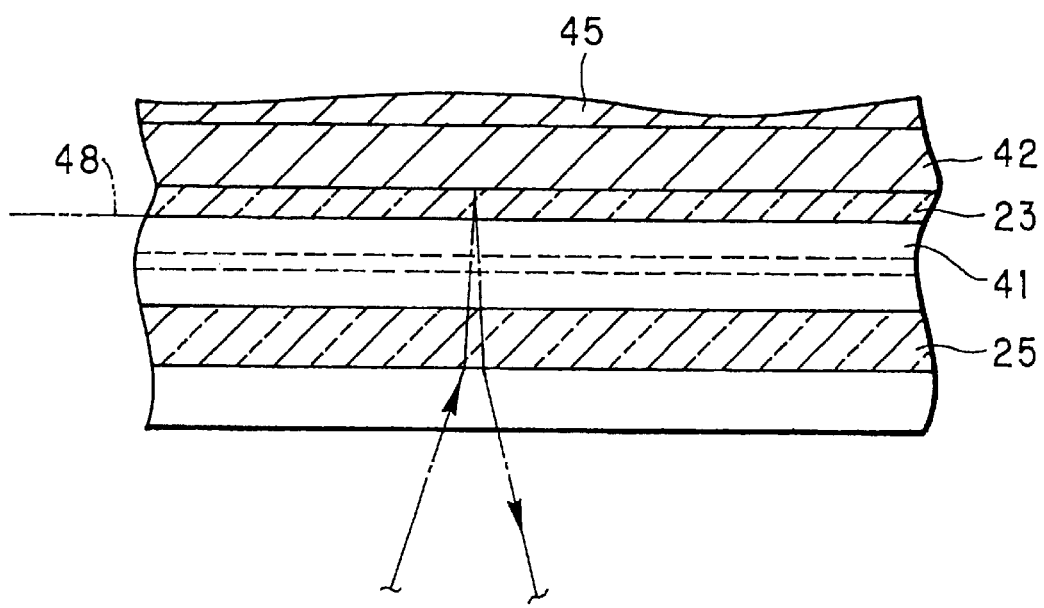
FIG. 3 is an explanatory view in section illustrating a stage and a sheet cover according to another embodiment of overhead projector.
Figures 4A, 4B:
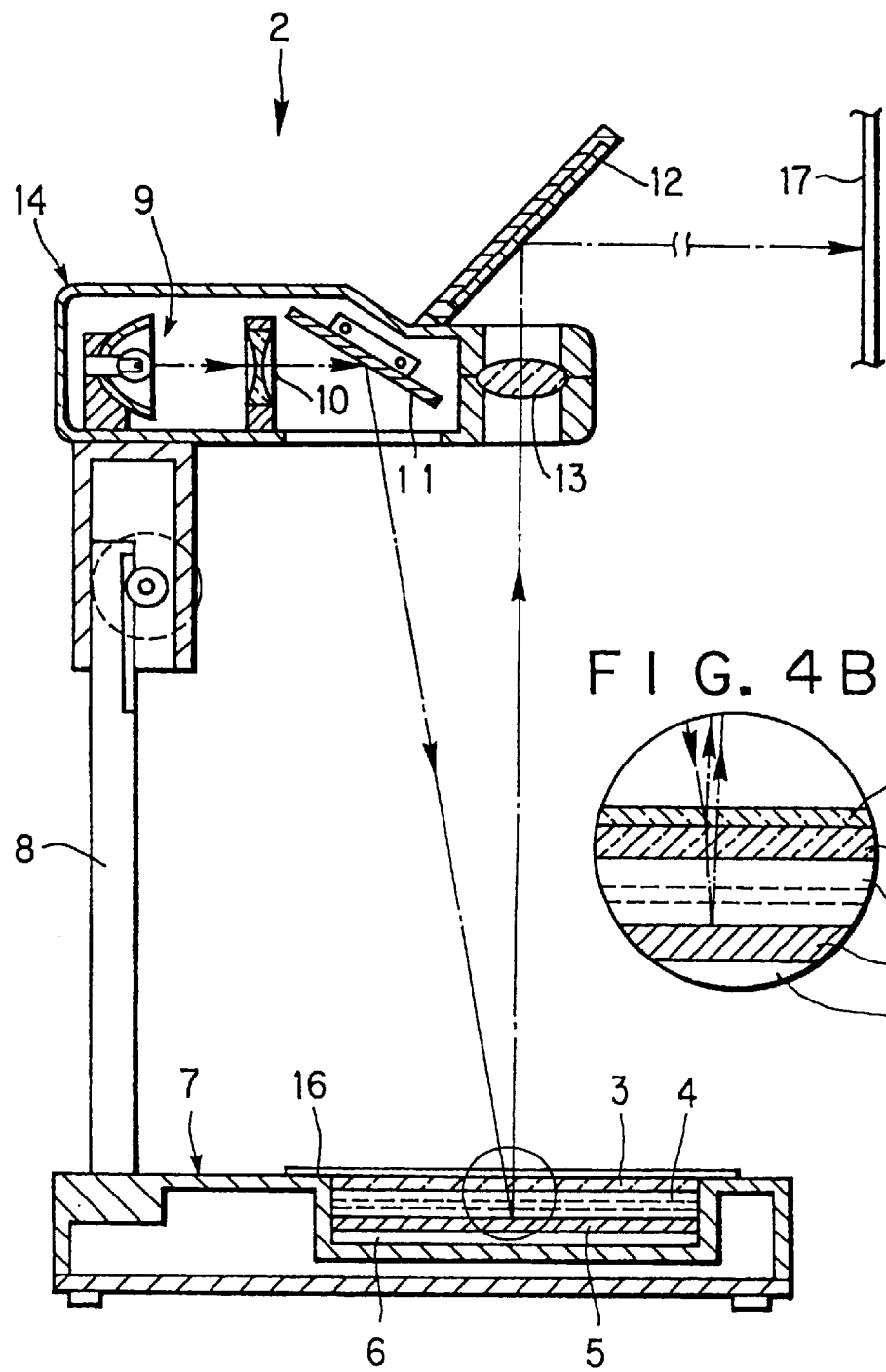
FIG. 4 is a vertical section illustrating an overhead projector according to the prior art.

In FIG. 1, a projector 20 of a reflection type is constituted by a projector body 21 or cabinet and a sheet cover 22. The projector body 21 has a rectangular shape. The sheet cover 22 is secured to the top of the projector body 21 in a rotatable manner. There is a stage opening 27 formed in the top of the projector body 21. In the stage opening 27 are supported a Fresnel lens 25 and a transparent stage plate 26. The Fresnel lens 25 is constructed as known in the field of optical instruments. The transparent stage plate 26 is for example a glass plate, and mounted on the top of the Fresnel lens 25. In combination of the Fresnel lens 25 and the transparent stage plate 26, a stage 24 is defined for placement of a transparency 23 as an original sheet. In FIGS. 2 and 3, a stage surface of the stage 24 is designated by a reference numeral 48.

A path converter mirror 29 is disposed in the projector body 21 and under the stage 24, and inclined at a predetermined angle. A light source 30 is contained in a front bottom region inside the projector body 21, and illuminates the stage 24 via the path converter mirror 29. The light source 30 is constituted by a lamp 31, a reflector 32 and a condenser lens 33. The condenser lens 33 condenses light from the lamp 31 toward the path converter mirror 29. There is a cooling fan (not shown) disposed near to the light source 30 for eliminating heat generated by the light source 30. The projector body 21 has a number of slits (not shown) arranged for discharging heated air created by the cooling operation.

Under the path converter mirror 29, a controller 35 is disposed for controlling the projector 20. The controller 35 includes a control circuit for controlling the projector 20, a power source circuit, an image input circuit, and the like. The controller 35 is connected to an image input terminal, and a set of plural switches disposed externally on a lateral side of the projector body 21. Those switches include a power source switch, an LCD powering switch, and a sheet projection switch for projection of a transparency. The image input terminal is used in connection of the LCD panel to a video player, a microcomputer, or the like.

A projection lens 37 is disposed in a central deepened position of the front of the projector body 21. The projection lens 37 is mounted in a lens barrel 38 and secured to the projector body 21. The projection lens 37 is moved back and forth along an optical axis upon external operation of a focussing button, for the purpose of focussing. To use the projector 20, the projection lens 37 is directed to a screen 39.

The sheet cover 22 has an edge 22a, which is supported on a cover support 21a of the projector body 21 in a rotatable manner between a closed position of being folded and overlapped on the stage 24, and an open position of being raised from the stage 24 to open the stage 24. The sheet cover 22 incorporates a liquid crystal display (LCD) panel 41 of a nematic-cholesteric phase-transition type and an illuminating mirror 42, which are supported by a support frame 43. When the sheet cover 22 is overlapped on the stage 24, the LCD panel 41 is fitted on the transparent stage plate 26. Over the illuminating mirror 42, a driver circuit board 45 is disposed inside the sheet cover 22 for driving the LCD panel 41. The driver circuit board 45 is connected to the controller 35 in the projector body 21, and controlled by the controller 35.

The LCD panel 41 of the nematic-cholesteric phase-transition (NCPT) type is principally based upon the electro-optical effect of the phase transition from the cholesteric phase to the nematic phase, or the reverse phase transition from the nematic phase to the cholesteric phase. When a potential or voltage (for electrical field) over a threshold value is applied to the LCD panel 41, optical transmittance of the LCD panel 41 becomes as high as 80–90%, which is near to complete transparency. The LCD panel 41 is turned on and off by operation of the LCD powering switch. When a reproducing command is entered to the video player connected to the image input terminal, the LCD panel 41 displays an image. To project an image of the transparency 23, the sheet projection switch is operated. Voltage over a threshold value is applied to the LCD panel 41, to maximize the optical transmittance of the LCD panel 41, to stand by for projection of the transparency 23.

The operation of the above construction is described now. To project an image, the projection lens 37 is directed to the screen 39. The projector 20 is placed at a distance as required from the screen 39. For the projection of an image of the LCD panel 41, a video player is connected to the image input terminal on a side of the projector body 21.

The projector 20 and the LCD panel 41 are powered by operating the switches. The video player is manually operated for reproducing an image. The light from the light source 30 is reflected by the path converter mirror 29 to illuminate the stage 24 upwards, and passed through the Fresnel lens 25, the transparent stage plate 26 and the LCD panel 41, and is incident on the illuminating mirror 42. The light is reflected by the illuminating mirror 42, illuminates the image on the LCD panel 41, is passed through the transparent stage plate 26 and the Fresnel lens 25, and is incident on the path converter mirror 29 again. The light from the path converter mirror 29 is directed to the projection lens 37, and is projected to the screen 39.

The lens barrel 38 is operated to adjust the focal point, so that the image of the LCD panel 41 is projected sharply on the screen 39. Note that the illuminating light from the light source 30 is partially reflected by a rear surface of the transparent stage plate 26 and directed to the projection lens 37. But this reflected light has not been passed through the LCD panel 41, so that there does not occur a double-projection phenomenon where the one image would be projected in a double manner.

To project the image of the transparency 23, the transparency 23 is placed on the stage 24 before the sheet cover 22 is closed. The transparency 23 is squeezed between the transparent stage plate 26 and the LCD panel 41. The projector 20 and the LCD panel 41 are powered. Also, the sheet projection switch is operated. The voltage over a threshold value is applied to the LCD panel 41, to maximize the optical transmittance of the LCD panel 41. This is a state optimized for projection of the transparency 23.

The illuminating light emanated from the light source 30 is reflected by the path converter mirror 29, and illuminates a bottom of the stage 24. In FIG. 2, the light passed through the Fresnel lens 25 is refracted by the Fresnel lens 25 and is directed up in a vertical direction. The light is passed through the transparent stage plate 26, the transparency 23 and then the LCD panel 41, and comes on to the illuminating mirror 42, without great change in the incident angle.

The light incident on the illuminating mirror 42 is reflected downwards in the vertical direction, is passed through the LCD panel 41 and illuminates the transparency 23. The light from the transparency 23 is passed through the transparent stage plate 26, is refracted again by the Fresnel lens 25, and is directed at predetermined angles. The light from the Fresnel lens 25 is again incident on the path converter mirror 29, is directed to the projection lens 37, and is projected to the screen 39. Subsequently the lens barrel 38 is operated to focus an image on the screen 39 to reproduce the image of the LCD panel 41 sharply.

After reflection on the path converter mirror 29, the light of the light source 30 is initially passed through the Fresnel lens 25, and directed in the vertical direction. There is only a small difference between the light reflected by the illuminating mirror 42 and the light reflected by the LCD panel 41. It is therefore possible sharply to project the image of the transparency 23 without double projection of the image.

In the above-noted embodiment, the projector body 21 contains the Fresnel lens 25 and the transparent stage plate 26. The sheet cover 22 contains the LCD panel 41 and the illuminating mirror 42. Alternatively it is also preferable as depicted in FIG. 3 that the projector body 21 contains the Fresnel lens 25 and the LCD panel 41, and that the sheet cover 22 contains the illuminating mirror 42, for the purpose of preventing occurrence of double projection of an image. This embodiment does not include the transparent stage plate 26. This is further favorable in reducing the cost of the projector.

In the above embodiment, the sheet projection switch is manually operated for standby of projecting the transparency 23. Alternatively it is possible to detect the transparency 23 automatically. For this, a photo sensor may be disposed in the top of the stage or the bottom of the sheet cover 22, for detection of the transparency 23 on the stage. If the transparency 23 is, the LCD panel 41 may be responsively controlled to have a maximum transparency.

The present invention is also applicable to an overhead type of projector of which a projector head is located in a top position of a stay of the projector.

In the above embodiments, the Fresnel lens 25 is used in combination with the illuminating mirror 42. Alternatively it is possible in the present invention that a Fresnel mirror is used in a position of the illuminating mirror.

In the above embodiments, the LCD panel 41 is included in either the projector body 21 or the sheet cover 22. The present invention is applicable to a construction in which the LCD panel 41 has a separable structure from the body of the projector 20, and is not built-in. In the above embodiments, the sheet cover 22 is openable. The present invention is applicable to a projector in which the sheet cover 22 is not openable but attached to the projector body 21, and the projector body 21 has a lateral slot for insertion of the transparency 23.

In the above embodiment, only either one of the image of the transparency 23 and the image of the LCD panel 41 is projected by the projector. It is of course possible that a projecting operation can be effected by projecting both of the image of the transparency 23 and the image of the LCD panel 41 at the same time, for the purpose of overlapping the two images on one another, for example a caption or words on to a pictorial image.

In the above embodiments, the optical transmittance of the LCD panel 41 becomes maximized as 80–90% in response to application of the voltage over its threshold value to the LCD panel 41. The LCD panel 41 is the type being opaque when not powered. Alternatively it is possible to use an LCD panel which is a type which is transparent when not powered, and is turned opaque in response to application of voltage thereto. In the above embodiments, the LCD panel 41 is a nematic-cholesteric phase-transition (NCPT) type. Alternatively it is possible to use an LCD panel of any type.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A projector of a reflection type, including:
   a stage surface against which a transparency may be positioned,
   a Fresnel lens disposed on a side of the stage surface opposite the transparency,
   a light source, disposed on a side of said Fresnel lens opposite the stage surface, for illuminating said stage surface through said Fresnel lens,
   an illuminating mirror, disposed on a side of said stage surface opposite said Fresnel lens so that said transparency may be positioned between said illuminating mirror and said stage plate, for reflecting light passed through said transparency after emanation from said light source to illuminate said transparency with reflected light, and
   a projection lens for projecting an image of said transparency via said Fresnel lens to a screen, said projector of a reflection type comprising:
   a liquid crystal display panel disposed so that said stage surface lies thereon, said liquid crystal display panel being transparent when said transparency is set on said stage surface, for enabling projection of said image, said liquid crystal display panel displaying an image to be projected to said screen when said stage surface lacks a transparency set thereon;
   a projector body in which said light source, said Fresnel lens and said Projection lens are incorporated; and
   a sheet cover, disposed on said projector body in a rotatable manner, for keening said transparency pressed, said sheet cover incorporating said illuminating mirror;
   wherein said liquid crystal display panel is secured to said sheet cover and covers said illuminating mirror.

2. A projector of a reflection type as defined in claim 1, wherein said liquid crystal display panel is a nematic-cholesteric phase-transition type.

3. A projector of a reflection type as defined in claim 1, further comprising a path converter mirror, disposed on said second side with respect to said Fresnel lens with an inclination, for reflecting said light from said light source toward said stage surface, and for reflecting said light from said illuminating mirror toward said projection lens, said projection lens being disposed in a lateral wall of said projector body and directed with an upward inclination.

4. A projector of a reflection type as defined in claim 3, further comprising a transparent plate, mounted on said projector body, and having a top face on which said stage surface lies.

5. A reflection-type projector, comprising:
   a light source;
   a Fresnel lens positioned to receive light from the light source;
   a stage surface arranged next to the Fresnel lens opposite the light source;
   a liquid crystal display panel arranged next to the stage surface opposite the Fresnel lens;
   an illuminating mirror arranged next to the liquid crystal display panel opposite the stage surface; and
   a projection lens arranged to receive light reflected by the illuminating mirror;
   wherein the stage surface and the liquid crystal display panel are positioned to allow a transparency to be disposed therebetween;

wherein the light source is positioned so that light from the light source passes sequentially through the Fresnel lens, the stage surface, and the liquid crystal display panel to the illuminating mirror, the light reflected from the illuminating mirror then passing sequentially through the liquid crystal display panel, the stage surface, and the Fresnel lens to the projection lens.

6. The reflection-type projector of claim 5, wherein the liquid crystal display panel may be controlled so that the liquid crystal display panel is transparent to allow projection of an image present on said transparency when said transparency is positioned between the liquid crystal display panel and the stage surface.

7. The reflection-type projector of claim 6, further comprising:
   a projector body housing the light source, the Fresnel lens, and the projection lens; and
   a sheet cover movably connected to the projector body, the illuminating mirror being attached to the sheet cover, wherein the sheet cover is movable to secure the transparency to the stage surface.

8. The reflection-type projector of claim 7, further comprising:
   a path converter mirror positioned to reflect light from the light source to the Fresnel lens as well as to reflect light from the illuminating mirror to the projection lens.

9. The reflection-type projector of claim 7, wherein the liquid crystal display panel is secured to the sheet cover next to the illuminating mirror.

10. The reflection-type projector of claim 5, further comprising:
    a projector body housing the light source, the Fresnel lens, and the projection lens; and
    a sheet cover movably connected to the projector body, the illuminating mirror being attached to the sheet cover, wherein the sheet cover is movable to secure the transparency to the stage surface.

11. The reflection-type projector of claim 10, further comprising:
    a path converter mirror positioned to reflect light from the light source to the Fresnel lens as well as to reflect light from the illuminating mirror to the projection lens.

12. The reflection-type projector of claim 10, wherein the liquid crystal display panel is secured to the sheet cover next to the illuminating mirror.

* * * * *